J. R. VAN ORTHWICK.
HARROW.
No. 171,887. Patented Jan. 4, 1876.
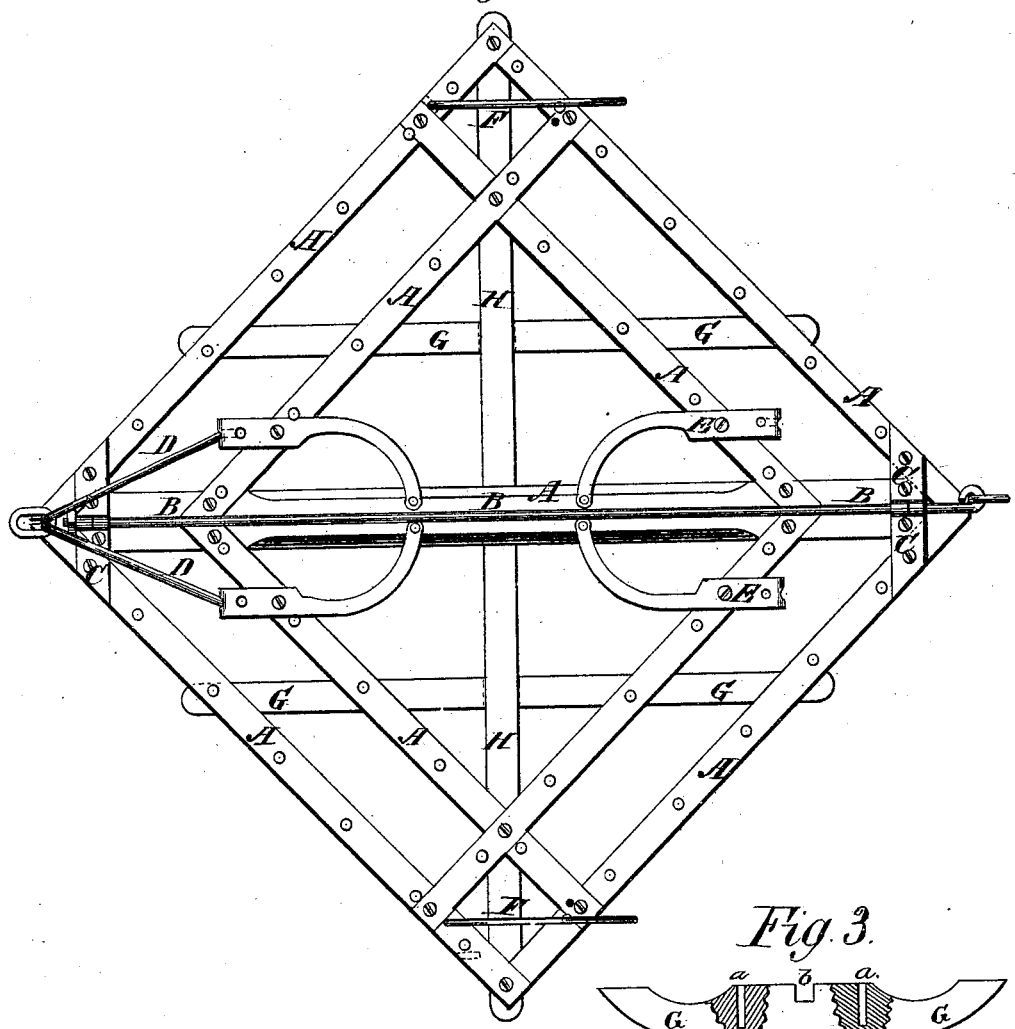
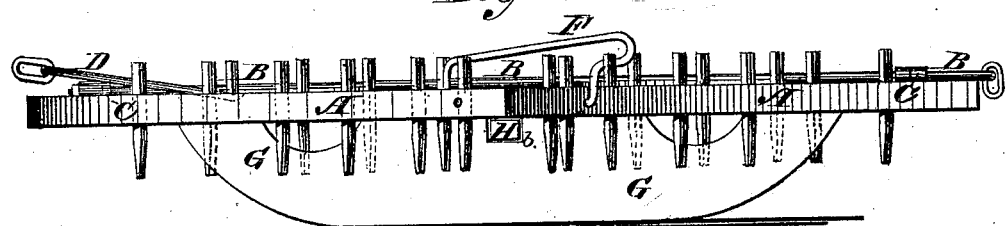
WITNESSES:
Francis McArdle.
A. F. Larry
INVENTOR:
J. R. Van Orthwick
BY
Munn & Co.
ATTORNEYS.

UNITED STATES PATENT OFFICE.

JOSEPH R. VAN ORTHWICK, OF HILLSDALE, MICHIGAN.

IMPROVEMENT IN HARROWS.

Specification forming part of Letters Patent No. 171,887, dated January 4, 1876; application filed September 25, 1875.

*To all whom it may concern:*

Be it known that I, JOSEPH R. VAN ORTHWICK, of Hillsdale, in the county of Hillsdale and State of Michigan, have invented a new and useful Improvement in Harrows, of which the following is a specification:

Figure 1 is a top view of my improved harrow, showing in dotted lines the position of the runners and cross-bar when in use. Fig. 2 is a side view of the same. Fig. 3 is a side view of one of the runners detached.

Similar letters of reference indicate corresponding parts.

The invention is an improvement in the class of harrows provided with runners, on which they are drawn or hauled to and from the field to be cultivated.

The improvement relates essentially to providing the hinged sections of a harrow with detachable runners having such construction as adapts them to be readily applied thereto, and to receive a locking-bar, by which said hinged sections are held rigidly in the same plane, and thus adapted for transportation of grain, &c., to the field to be harrowed and sowed.

In the drawing, A A represent the two triangular toothed sections of the harrow, which are connected on one side by means of a pivot-rod, B, and hinges C. Said sections are provided with handles F and a draft attachment, the latter consisting of curved plates E E and detachable rods D D. Each of the runners G is rounded or curved upward at each end, provided with holes *a* to receive the teeth of the harrow-section to which it is applied, and also with a central notch or mortise, *b*, to receive the bar H, by which the sections A A are prevented turning on the pivot-rod B—i. e., held parallel to the same plane.

The runners are first applied by raising the outer end of each section A by means of its handle F, and the teeth of the harrow inserted in holes *a*, and the bar H then slid or inserted through the notches or mortises *b b* beneath the bars composing each section. Thus the harrow is adapted for employment in the transportation of grain to the field, the same being placed or loaded upon the top thereof, thus saving extra or additional means for effecting such transportation. The runners are also more readily applied to a hinged half or section, A, than to a harrow of like size having a rigid frame, since the latter would require twice the exertion to raise it.

What I claim is—

The detachable runners G G, having holes *a* to receive the harrow-teeth, and a central notch, *b*, and the locking-bar H, in combination with the hinged sections A A of the harrow, as shown and described.

JOSEPH RANDALL VAN ORTHWICK.

Witnesses:
 TIMOTHY E. DIBELL,
 WM. R. MONTGOMERY.